April 11, 1939.    W. THOMAS    2,153,901
METHOD AND APPARATUS FOR PRODUCING SWINGING DISSOLVE MOTION PICTURES
Filed Jan. 13, 1936    2 Sheets-Sheet 1
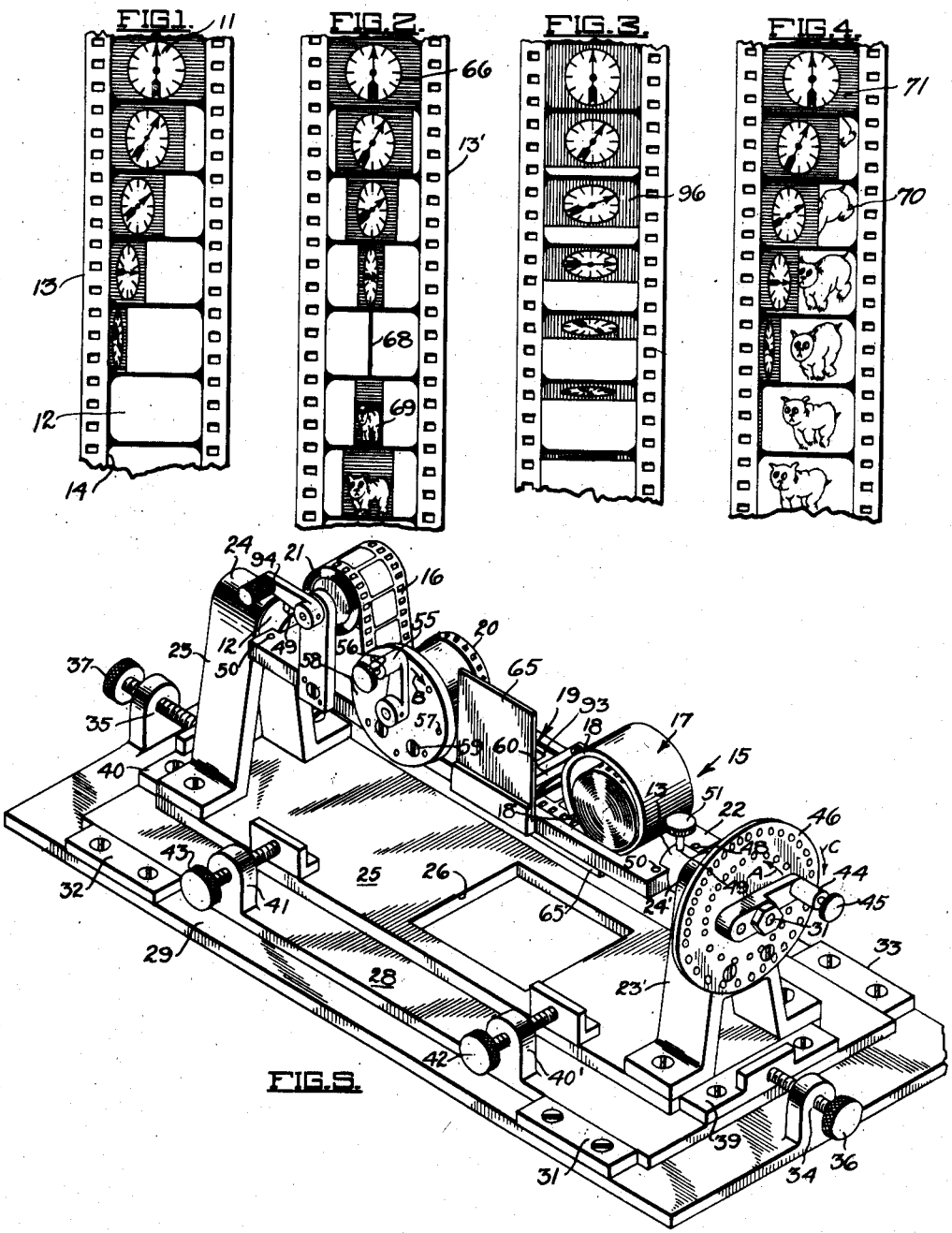
INVENTOR.
WILLIAM THOMAS
BY
ATTORNEY April 11, 1939.　　　　W. THOMAS　　　　2,153,901
METHOD AND APPARATUS FOR PRODUCING SWINGING DISSOLVE MOTION PICTURES
Filed Jan. 13, 1936　　　2 Sheets-Sheet 2
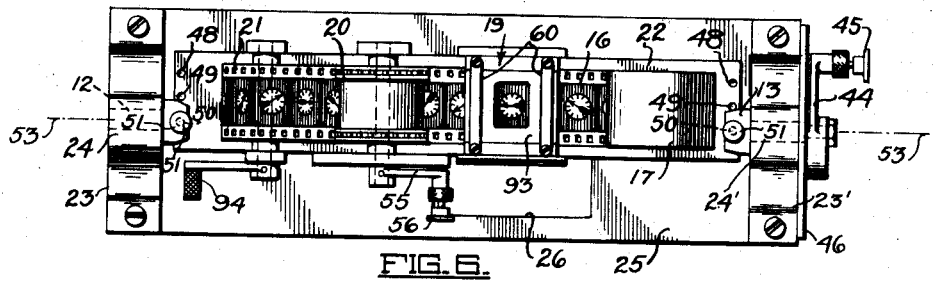
INVENTOR
WILLIAM THOMAS
BY W. E. Beatty
ATTORNEY

Patented Apr. 11, 1939

2,153,901

UNITED STATES PATENT OFFICE 2,153,901

METHOD AND APPARATUS FOR PRODUCING SWINGING DISSOLVE MOTION PICTURES

William Thomas, Glendale, Calif., assignor to Warner Bros. Pictures, Inc., New York, N. Y., a corporation of Delaware Application January 13, 1936, Serial No. 58,905

16 Claims. (Cl. 88—16)

This invention relates to motion picture photography and more particularly to the book or swinging type of dissolves wherein one scene on a motion picture film fades or cuts into another scene through a dissolving action somewhat similar to the turning of the pages of a book. The various scenes are thereby represented as being formed upon the successive pages of a book.

In many instances in motion picture photography it is desirable to use the book type of dissolve when changing from one scene to another, for example, in the case of animated cartoon pictures the various scenes may be portrayed as being played upon the various pages of a book. When one picture or scene upon a certain page is finished the illusion is formed of that page being turned to enable the action on the next successive page to be seen.

Although I am aware of the fact that swinging dissolves of the above described type have been heretofore employed, however, action in these previous types was stopped during the illusionary rotation of the page on which the action was portrayed.

An object of the present invention is to maintain movement or animation of an action on a motion picture film during the dissolve period.

This is accomplished by producing a series of pictures, successive pictures of which show successive or kinematic phases of the action which is to be photographed during the dissolving motion. Preferably the series of pictures is in the form of a positive motion picture film which has been made from a negative exposed in the usual motion picture camera. The successive positive pictures of the series thus produced are successively rephotographed upon a motion picture film in a camera while placing each successive positive picture in a different angular position about an axis preferably perpendicular to the photographic axis passing through the film.

Another object of the invention is to locate the axis of rotation of the dissolve action.

This is accomplished by adjustably carrying the aperture gate member for the series of pictures to be photographed, by means of a rotatable member journalled in a bearing support. The aperture gate member is adjustable transversely of the rotatable member so as to adjust the axis of rotation of the swinging dissolve.

In a preferred form of my invention the photographing camera is mounted stationary in a vertical position above the dissolve device. This dissolve device is turned step by step to change the perspective aspect of the film to be photographed. As the perspective aspect of the film is varied, the film itself is intermittently moved a distance of one frame at a time past a film gate provided in the dissolve device. As the film is being rotated into a plane parallel to the photographic axis of the motion picture camera, the exposed picture area of each frame will change in decreasing gradients until a point is reached where no exposure is made upon the sensitized film in the camera. The next succeeding scene may then be photographed upon the unexposed portions of each of the above frames until a frame is reached wherein no pre-exposure has been made. At this point the dissolve from one scene to the other will be complete.

More particularly describing the invention reference is to be had to the accompanying drawings wherein:

Fig. 1 is a fragmentary view of a motion picture film showing a side type of swinging or book dissolve wherein the action is rotated about one side of the picture frame.

Fig. 2 is another fragmentary view of a motion picture film showing a swinging dissolve whereby the action is rotated about the center of the picture frame.

Fig. 3 is a fragmentary view of a film showing the action being swung about a horizontal axis at the top edge of the picture frame.

Fig. 4 is a fragmentary view of a film showing a swinging side dissolve with the next successive picture scene associated therewith as produced by a traveling mat process.

Fig. 5 is a perspective view of a preferred form of book or swing dissolving device.

Fig. 6 is a plan view of the device shown in Fig. 5.

Fig. 7 is a plan view of a swinging dissolve device for producing a swinging dissolve rotatable about a horizontal axis as shown by the film in Fig. 3.

Fig. 8 is a diagrammatic view of the complete photographic apparatus for producing swinging dissolve types of pictures.

The master positive film 16 from which the dissolving action is to be photographed is provided in a supply magazine 17 formed, in this case, of a partially cylindrical shell 18 which is adapted to hold a roll of film. An opening 18' is provided in shell 18 to allow the film to be drawn therethrough. From the magazine 17 the film 16 is passed through an aperture gate generally indicated at 19, under a film moving sprocket 20, and thence onto a take-up roll 21. The magazine 17, aperture gate 19, sprocket 20 and take-roll 21 are all mounted upon a rotatable aperture plate 22.

Plate 22 is adapted to be mounted in one of a number of various positions, hereinafter described, in rotatable end members or trunnions 12 and 13 rotatably journaled in bearings 24 and 24' in the upper ends of inverted V-type brackets 23 and 23', the lower ends of each being secured to a base plate 25. An aperture 26 is formed in the aperture plate 25 directly below the aperture gate 19 to allow a diffused light from a suitable light source below the plate 25 to be projected onto the under surface of the film 16 as it passes the aperture 19. Thus a camera mounted above the device 15, as shown in Fig. 8, and positioned vertically may successively photograph the successive individual frames of film 16. Base 25 is adjustably supported upon a sub-base plate 28, which in turn is supported by a third plate 29. Plate 28 is slidably guided in a longitudinal direction upon the plate 29 by means of guide blocks 31, 32, 33, etc. Threaded lugs 34 and 35 on either end of the base 29 carry adjusting screws 36 and 37 to adjust the position of the sub base 28 longitudinally of base 29. Guides 39 and 40 provided on the base 28 guide the uppermost base 25 in a transverse direction on base 28. Threaded lugs 40' and 41 carry adjusting screws 42 and 43 for adjustment of the plate 25 transversely of the sub base 28. Similar threaded adjusting screws are provided on an opposite side of the base 28.

The rotatable plate 22 carrying the picture film 16 to be photographed is adapted to be adjusted in predetermined equal angular components through the use of an indexing handle 44 suitably secured to one of the plate supporting trunnions 13. Handle 44 has a spring plunger pin, the head of which is shown at 45, which is adapted to engage any one of a series of holes provided in an indexing disc 46. The indexing holes in disc 46 are provided in two concentric circles, the upper half of each of these circles having a different number of equally spaced holes therein than the lower portions. The handle 44 has two holes therein each of which is adapted to be rigidly engaged on the pin 31 so that the plunger pin 45 may engage either one of the two concentric circular rows of indexing holes. Therefore four different sets or rows of indexing holes may be provided, each one having equal central distances between holes for indexing the plate 22 about 90°. Although each semi-circular row of holes is shown as being equally divided, the holes, if desired, may be so spaced that their center distances progressively increase or decrease. As shown in Fig. 6, the rotatable plate 22 has on either end thereof a set of three holes 48, 49, and 50, either set of which may be engaged by a pin 51 passing through a hole formed in each of trunnions 12 and 13 aligning either set of holes 48, 49, and 50 with the central axis 53 of the trunnions 12 and 13. By aligning either set of holes 48, 49, and 50 with pins 51 the position of rotation may be changed, that is, in the position shown in Fig. 6, the axis of rotation is about the left edge of the picture frame of film 16 as indicated by the resulting film in Fig. 1. By aligning the holes 49 on the central axis, the rotation will be about the center of film 16 and the resulting photographed film will be shown in Fig. 2. Alignment of the holes 48 with the central axis will cause the action to appear to rotate about the right hand edge of the film instead of the left hand edge 14 of Fig. 1.

Sprocket 20 has a handle 55 secured to the shaft therefor for rotation thereof. Handle 55 has a spring pressed plunger 56 similar to that of 45 which is adapted to engage any one of a series of indexing holes 57 provided in an indexing plate 58 suitably secured to the rotatable plate 22 by means of screws 59. Plate 58 also forms one of the bearing supports of the sprocket 20. The distance between the indexing holes 57 are such that the rotation of the handle 55 from one hole to the next moves the film 16 a distance of one frame. Gate 19 comprises a pressure plate 93 and a pair of spring pressure clips, one of which is shown at 60 (Fig. 5). This plate 93 holds the film 16 to be photographed against the gate while passing therethrough.

In photographing the film 16 for the film dissolve action, an apparatus such as illustrated in Fig. 8 is employed. Here the motion picture camera 61 is mounted stationary above the dissolve device 15 and is placed in a vertical position so as to be focused upon the film at the aperture gate 19. The device 15 is mounted upon the upper surface of an enclosed support 62. A suitable lamp 63 provided within the support 62 projects a beam of light upward onto the surface of a translucent sheet of glass or other material 64 covering an aperture 67 in the upper surface of the support 62.

In the operation of the device the rotatable aperture plate 22 is set in the horizontal position as shown in Fig. 5 and one frame of the positive film is photographed in camera 61. The handle is then indexed one hole in the direction of the arrow A. At the same time handle 55 is indexed one hole in the direction of the arrow B. The next successive frame of the film in camera 61 is then exposed and the foregoing cycle repeated until the aperture plate 22 is rotated into a vertical position. The film 16 after passing through the film gate 19 and under sprocket 20 is reeled upon the take-up roll 21 through the action of a take-up handle 94 operatively attached to roll 21. It will, therefore, be seen that the film in camera 61 will register a book or swinging dissolve in which the action during the dissolving movement is continuous. The speed of the dissolving action is governed by the particular row of indexing holes traversed by the indexing handle 44 through 90°, that is, by using a set of holes whose center distances are small, the dissolving action will be longer and more gradual than when the center distances are large.

In order to prevent light from the translucent screen 64 from exposing the film in camera 61 while the aperture plate 22 is swinging into a vertical plane a shield 65 is attached to one side of the aperture plate 22 adjacent the gate 19. This mask 65 serves to block out the light passing the edge of aperture plate 22 when the plate 22 is rotating toward or from a vertical position. A second mask 65' on the opposite side of plate 22 is provided for the same purpose.

In producing a film as shown in Fig. 1, wherein the action, indicated by a dial 11, is to be rotated about edge 14, the holes 50 of plate 22 are aligned with the centers of members 12 and 13, as shown in Fig. 6. When the plate 22 carrying the master film 16 is rotated into a vertical position, the resultant picture frame 12 of the photographed film 13 will be blank. In making the film 13', shown in Fig. 2, the holes 49 of plate 22 are aligned with the rotatable members 12 and 13.

The rotatable aperture plate 22 is set in a horizontal position and the handle 44 is successively indexed in the direction of arrow A (Fig. 5), while at the same time intermittently advancing the film 16 through the action of the sprocket handle 55. After the handle 44 has been indexed about 90° the photographed image of the action being dissolved, which in this case shows a dial 66, will, of course, approach a straight line 68. At this point a second film is inserted in the device 15 and the handle 44 is then indexed around in the direction of the arrow C, while intermittently advancing the film through movement of the indexing handle 55. This action will show the next succeeding scene coming into view, which in this case is illustrated by an animate object 69.

Fig. 4 shows a film in which the swinging dissolve has been accomplished in the same manner as Fig. 1. However, in this case a traveling mat dissolve or other suitable method has been employed to photograph the next succeeding scene which in this case is an animate object 70 upon the film. One manner in which this may be accomplished is to first photograph the swinging dissolve action 71 and then by means of a traveling mat which exactly covers the exposed portions, print adjacent thereto the succeeding scene.

Fig. 7 shows a modified form of the invention which is employed to photograph a film in which the action swings about a horizontal axis such as shown at 96 in Fig. 3. A rotatable aperture plate 75 carries an aperture 76 the central portion of which is adapted to receive and hold a single frame 77 of a motion picture film to be photographed in a book dissolve. Pins 78 are provided to be engaged by the sprocket holes in the film 77 and thus hold the film in accurate alignment. The base plate 75 has a set of holes 78', 79, and 80 on either end thereof, each of which is adapted to be engaged by pins 81 extending through rotatable members or trunnions 83 and 84. Trunnions 83 and 84 are rotatably journalled in bearings 85 and 86 which are secured as by screws 87 to a base plate 88 similar to that of 25 (Figs. 5 and 6). Base plate 88 has an enlarged aperture 89 therein which allows light to be projected upon the under surface of the film frame 77 in a manner similar to that shown in Fig. 8. An indexing handle 89 and indexing plate 89', similar to that of 44 and 46 respectively of Fig. 5, is provided to accurately index the rotatable base plate 75 about a horizontal axis. An upwardly extending mask 90 is provided on one side of the plate 75 and a second downwardly extending mask 91 is provided on the opposite side of plate 75 to prevent photographing light from exposing the film while the plate 75 is rotating toward a vertical position.

It will be apparent that after photographing the film frame 77 in Fig. 7, the remaining frames of one scene are photographed in succession with the aperture plate or film gate 75 in successively rotated positions whereby there is photographed on the negative film in the camera a dissolve as shown in Fig. 3.

Having thus described the invention, what is claimed as new and desired to secure by Letters Patent, is:

1. The method of making picture dissolves for motion picture films which comprises, preparing a motion picture film of the portion of the action to be dissolved, intermittently advancing the film across the photographic axis of a camera, progressively turning said film about an axis in the focal plane of the camera in timed relation with said advancing to vary the perspective aspect thereof, and intermittently photographing said film, as thus advanced and turned, upon a motion picture film in said camera.

2. An apparatus for making picture dissolves on motion picture films which comprises the combination of means for supplying a printing light, a camera, and a picture gate having a printing aperture therebetween, means for advancing step by step through said gate a strip having a series of pictures thereon showing successive movement of an action, means for rotating said gate through an angle of substantially 90° about an axis extending across said aperture, and means for locking said gate in various positions throughout said angle.

3. Apparatus for making picture dissolves on motion picture films comprising the combination of a camera, means for supplying a printing light, a picture gate therebetween having a photographic aperture, means for advancing a motion picture film across said aperture, and means supporting said gate for rotation through an angle of substantially 90° about an axis extending across said aperture.

4. An apparatus for making swinging dissolves on a motion picture film comprising the combination of a printing light, a camera, a picture gate therebetween, a support for said gate, means on said support for advancing through said gate a film having a series of pictures thereon, means for rotating said support throughout an angle of substantially 90° about an axis extending across the picture frame area of said gate, and means for adjusting said support transversely of said axis to align the opposite border lines of said picture frame area at different times, and the center of said picture frame area at other times with the axis of rotation of said gate.

5. An apparatus for making dissolves upon a motion picture film which comprises a combination of, a picture gate, means for advancing a film having a series of pictures thereon through said gate, a bearing support having its axis extending across the picture frame area of said gate, a rotatable member journalled in said bearing for supporting said gate, and means whereby said gate may be adjusted transversely of the axis of said bearing to vary the axis of rotation of said gate to different positions in the picture frame area of said gate.

6. The process of preparing a dissolve which comprises photographically copying from a fixed viewpoint onto a negative film, a series of photographs of kinematic action while progressively moving said photographs in sequence in the focal plane of the camera to change the perspective aspect of said photographs respectively from said viewpoint whereby foreshortened images of said photographs are photographically copied directly from said photographs on progressively varying portions of the successive picture frames of the negative film, masking the progressively varying amounts of the picture frames of the negative film not reached by light from said photographs and later light impressing such unexposed portions of the negative film with a second series of images while protecting the previously exposed portions.

7. The process of preparing a dissolve which comprises photographing from a fixed viewpoint onto negative film, the images on the picture frames of a positive film while moving said positive film step by step in two manners, namely, advancing said positive film step by step across the photographic axis of the camera to successively bring the images on the positive film into the field of view of the camera while turning said positive film step by step about an axis lying substantially in the picture frame area of said positive film to progressively change the foreshortening of the picture frames of said positive film as photographed on said negative film.

8. Apparatus for making dissolves comprising the combination of a base, a bearing support for said base, means for adjusting said bearing support along directions at right angles to each other with respect to said base, spaced bearings carried by said bearing support, a picture gate rotatably mounted in said bearings, a handle for rotating said picture gate, and means cooperating with said handle to lock said gate in various angular positions throughout a wide angle.

9. Apparatus according to claim 8 comprising film supply means, film take-up means, film feeding means, and oppositely extending masks all carried by said gate.

10. Apparatus for making dissolves comprising spaced bearings, a picture gate rotatably mounted in said bearings with the optical axis of said gate extending substantially at right angles to the axis of said bearings, a plate having a light aperture in alignment with said gate, masks extending from opposite sides of said gate to variably mask the light from said aperture when said gate is rotated, and means for locking said gate in selected angular positions.

11. Photographic apparatus comprising the combination of a plate having an aperture for printing light, a rotatable picture gate in alignment with said aperture, and means for masking said printing aperture to an extent dependent upon the amount of rotation of said picture gate.

12. Photographic apparatus according to claim 11 wherein said masking means comprises a mask at each side of said picture gate, a handle for varying the separation of said masks, and means for retaining said masks in adjusted position.

13. Apparatus for making dissolves comprising the combination of a base, spaced bearings on said base, a stub shaft for each of said bearings, a picture gate movably mounted on said stub shafts, means for retaining said picture gate on said stub shafts with the axis of rotation of said stub shafts extending across the picture frame area of said gate, means for holding said gate in various angular positions about said axis, means for feeding film through said gate, and means for masking said gate by an amount depending on the angular position of said gate.

14. Apparatus according to claim 13 wherein means are provided for slidably mounting said picture gate on said stub shafts, said retaining means comprising interlocking members on said slidable gate and on said stub shafts.

15. Apparatus according to claim 13 wherein each of said stub shafts terminates in a U shaped bracket, said picture gate being slidably mounted in said brackets, said retaining means comprising an aperture in each end of said gate and a cooperating pin in each of said brackets.

16. Apparatus for making dissolves comprising spaced bearings, a picture gate rotatably mounted in said bearings with the optical axis of said gate extending substantially at right angles to the axis of said bearings, a source of printing light at one side of said gate, a camera at the other side of said gate, masks extending from opposite sides of said gate to variably mask the light from said source when said gate is rotated, and means for locking said gate in selected angular positions.

WILLIAM THOMAS.